United States Patent
Schneider et al.

(10) Patent No.: US 10,453,201 B2
(45) Date of Patent: Oct. 22, 2019

(54) SYSTEMS AND METHODS FOR SENSING A FAULT IN AN ELECTRONIC DISPLAY

(71) Applicants: Stanley Schneider, Denver, CO (US); Charles Schneider, Denver, CO (US)

(72) Inventors: Stanley Schneider, Denver, CO (US); Charles Schneider, Denver, CO (US)

(*) Notice: Subject to any disclaimer, the term of this patent is extended or adjusted under 35 U.S.C. 154(b) by 69 days.

(21) Appl. No.: 15/691,433

(22) Filed: Aug. 30, 2017

(65) Prior Publication Data

US 2019/0066307 A1    Feb. 28, 2019

(51) Int. Cl.
| | | |
|---|---|---|
| *H04N 7/18* | (2006.01) | |
| *G06T 7/20* | (2017.01) | |
| *G06T 13/80* | (2011.01) | |
| *B64D 43/02* | (2006.01) | |
| *B64D 45/00* | (2006.01) | |

(52) U.S. Cl.
CPC ............ *G06T 7/20* (2013.01); *B64D 43/02* (2013.01); *B64D 45/00* (2013.01); *G06T 13/80* (2013.01); *H04N 7/183* (2013.01); *H04N 7/185* (2013.01); *G06T 2207/30232* (2013.01); *G06T 2207/30268* (2013.01)

(58) Field of Classification Search
CPC ...... G09G 3/006; H04N 17/04; H04N 17/045; H04N 14/02; H04N 9/11; H04N 9/74; H04N 13/341
See application file for complete search history.

(56) References Cited

U.S. PATENT DOCUMENTS

| | | | | |
|---|---|---|---|---|
| 2003/0128174 A1* | 7/2003 | Scheibe | ................ | G09G 3/32 345/83 |
| 2009/0147861 A1* | 6/2009 | Schnebly | ............. | G06T 1/0085 375/240.27 |
| 2016/0039341 A1* | 2/2016 | Schondorf | ............... | G09G 5/14 348/118 |
| 2016/0165171 A1* | 6/2016 | Ardo | ......................... | G06T 7/20 348/589 |
| 2017/0255504 A1* | 9/2017 | Fletcher | ................ | G09G 3/006 |
| 2018/0190172 A1* | 7/2018 | Bronte | ................... | G09G 3/006 |

* cited by examiner

*Primary Examiner* — Jessica M Prince
(74) *Attorney, Agent, or Firm* — Mohr Intellectual Property Law Solutions, PC

(57) ABSTRACT

Methods of sensing a fault in an electronic display may include receiving streaming data to be displayed, appending the streaming data with an animation instruction, displaying the streaming data via a screen, monitoring the animation via a photo-sensor, sensing an interruption in the animation via the photo-sensor, and signaling, in response to the sensing step, a fault in the electronic display. The displaying step may include producing, in response to the animation instruction, an animation in a dedicated area of the screen. In some examples, the sensing and signaling steps may be performed without programmable software.

20 Claims, 3 Drawing Sheets

SYSTEMS AND METHODS FOR SENSING A FAULT IN AN ELECTRONIC DISPLAY

BACKGROUND

The present disclosure relates generally to critical electronic display systems. In particular, systems and methods for sensing a fault in the data stream of an electronic display are described.

Known systems for monitoring critical electronic displays are not entirely satisfactory for the range of applications in which they are employed. For example, in small aircraft many of the critical instruments with digital displays (e.g., digital attitude indicators and other digital displays) give no indication to the pilot when they are frozen. Thus, the pilot may dangerously oversteer the aircraft. While modern digital instruments and displays with integrated fault detection features are available, these instruments are expensive. Retrofitting existing aircraft with new instrumentation is frequently impossible or prohibitively expensive.

Thus, there exists a need for instrument fault detection systems that improve upon and advance the design of known such systems. Examples of new and useful systems and methods for sensing a fault in an electronic display which address the needs existing in the field are discussed below.

SUMMARY

Methods of sensing a fault in an electronic display may include receiving streaming data to be displayed, appending the streaming data with an animation instruction, displaying the streaming data via a screen, monitoring the animation via a photo-sensor, sensing an interruption in the animation via the photo-sensor, and signaling, in response to the sensing step, a fault in the electronic display. The displaying step may include producing, in response to the animation instruction, an animation in a dedicated area of the screen. In examples, the signaling step may comprise changing a state of a warning light. In some examples, the changing step may comprise changing the state of the warning light from on to off to indicate a fault in the electronic display. In some examples, the changing step comprises changing the state of the warning light from off to on to indicate a fault in the electronic display. In some examples, the signaling step comprises sounding an audible alarm. In some examples, the sensing and signaling steps are performed without the use of programmable software. In some examples, the sensing and signaling steps are performed entirely through a hardwired electrical circuit. In some examples, the animation comprises a strobing image. In some examples, the animation comprises a rotating image. In some examples, the photo-sensor comprises a detection photocell.

DETAILED DESCRIPTION

The disclosed systems and methods for sensing a fault in an electronic display will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods for sensing a fault in an electronic display are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
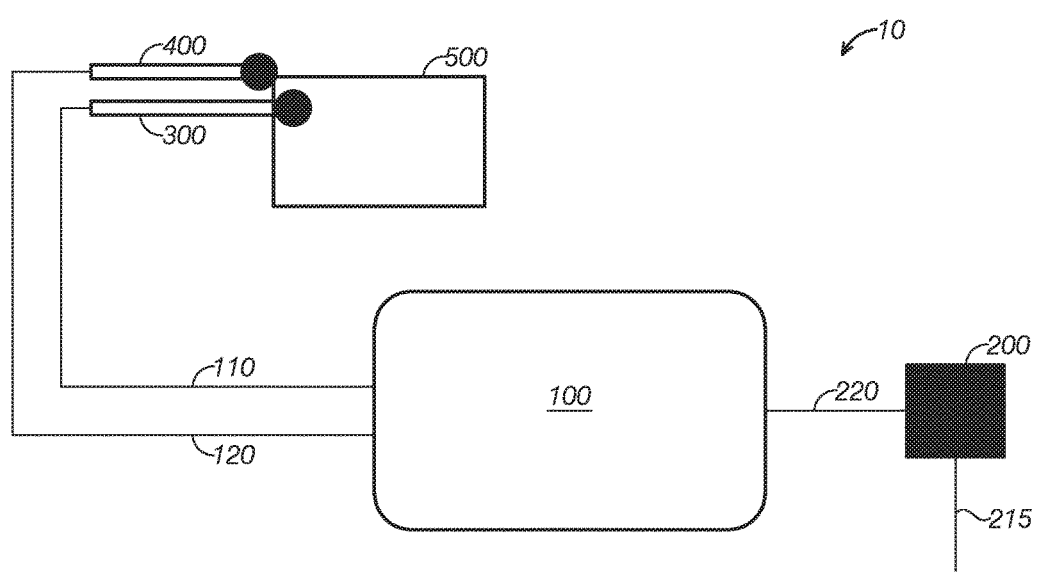
FIG. 1 is a schematic view of a first example of a system for sensing a fault in an electronic display.
Figure 3:
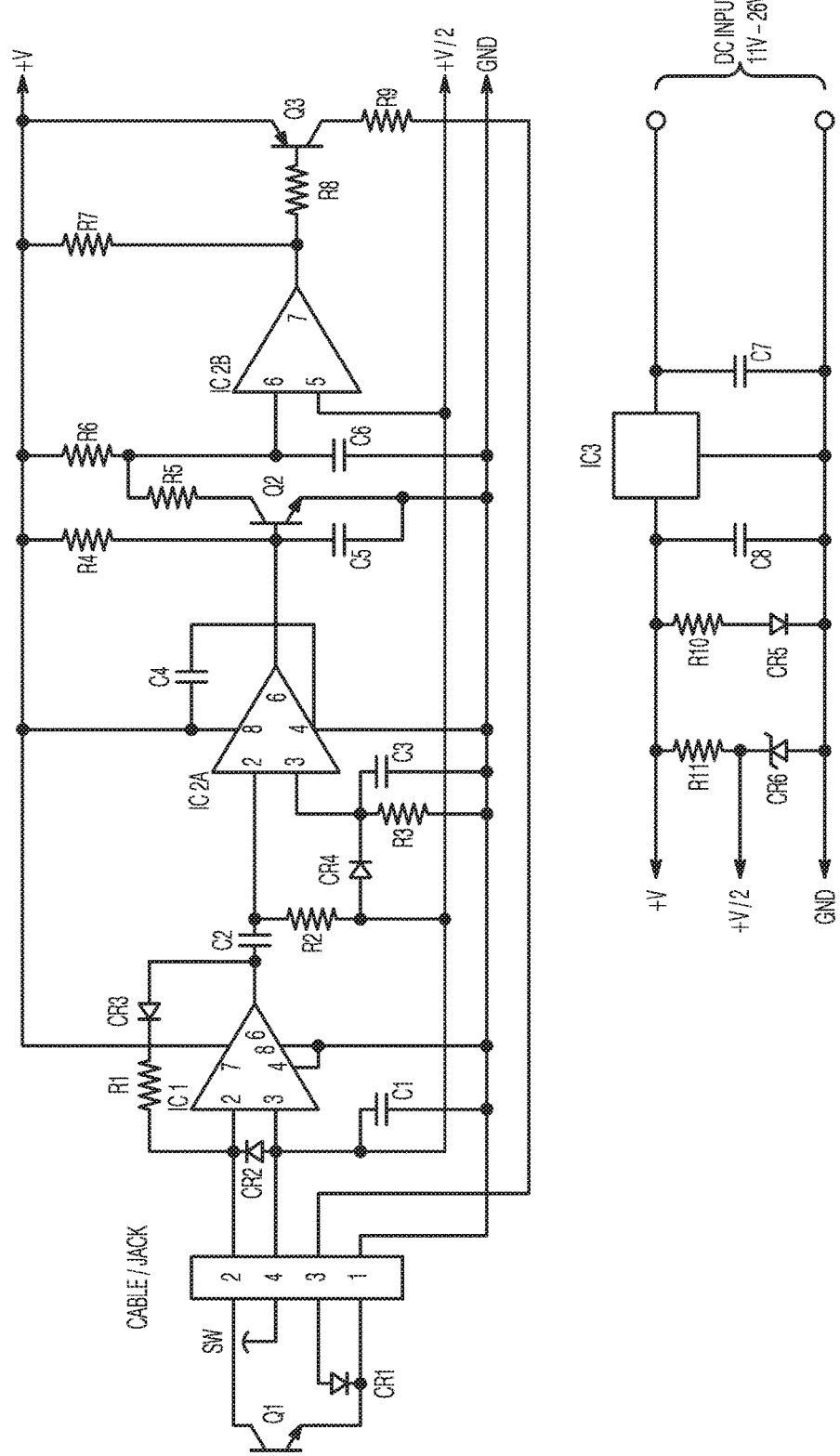
FIG. 3 is a schematic illustration of one example of a hardwired electrical circuit for use in sensing a fault in an electronic display.

With reference to FIGS. 1 and 3, a first example of a system for sensing a fault in an electronic display, system 10, will now be described. System 10 functions to sense a fault in an electronic display. In one embodiment, system 10 may sense when an electronic display has become "frozen". Further, system 10 may alert the user of the electronic display when such a fault has been detected. The reader will appreciate from the figures and description below that system 10 addresses shortcomings of conventional instrumentation systems.

Specifically, system 10 provides a simple, inexpensive and failsafe way to detect a fault in a critical electronic display. System 10 may be included with new instrumentation systems or retrofitted to existing instrumentation systems.

System 10 includes controller 100, optional power supply device 200, photo-sensor 300, warning device 400, and display device 500. Power supply device 200 may be connected to a power source via electrical connection 215. Power supply device 200 may provide conditioned electricity to controller 100 via electrical connection 220. Photo-sensor 300 may be in electrical communication with controller 100 via electrical connection 110. Warning device 400 may be in electrical communication with controller 100 via electrical connection 120.

Display device 500 functions to receive a stream of digital data and produce a display for the user based on the stream of data. For example, in aircraft applications, display device 500 may display, via one or more screens, a digital altimeter, airspeed indicator, vertical speed indicator, magnetic compass, attitude indicator, and/or heading indicator, among others.

When display device 500 is functioning correctly, the information being displayed will be constantly updated. However, when a fault occurs in the display device and/or the stream of digital data, the information being displayed by display device 500 may cease to update (i.e., "freeze"). If the user is unable to carefully study the information being displayed on display device 500, the user may not notice that the device is in fault and the information is no longer being updated. The user may then unwittingly rely on the outdated information being displayed, potentially making life-threatening steering or navigating errors based on the outdated information. Thus, the automatic fault detection provided by system 10, as described below, may be highly desirable.

Photo-sensor 300 may be directed at display device 500. Photo-sensor 300 functions to sense changes in the display. Specifically, photo-sensor 300 may sense changes in the color and/or intensity of light projected from the display device 500. In some embodiments, photo-sensor 300 may be focused on one region of the screen of the display device 500. In other embodiments, the photo-sensor may be configured to detect changes in light over the entire surface of the screen. In one embodiment, the photo-sensor 300 may comprise a photodiode. In some embodiments, the photo-sensor may comprise a detection photocell.

In some embodiments, the data stream to the display device 500 may be augmented with an instruction to produce an animation in a predetermined dedicated region of the screen. In some embodiments, the photo-sensor 300 may be focused on the predetermined region where the animation is displayed. As used herein, an "animation" is the display of a sequence of images configured to indicate movement to an electronic eye. In some embodiments, an animation may comprise the intermittent display (i.e., strobing) of a shape, such as a square or circle. In another example, an animation may comprise the display of a rotating shape, such as a pinwheel.

If the display device 500 encounters a fault (e.g., "freezes" due to, for example, an interruption in the data stream to the display device 500, or a malfunction in the device itself) then the animation may cease moving or disappear altogether. The photo-sensor may detect the interruption of the animation via controller 100, and thus the fault may be detected.

In other embodiments, the data stream may lack an instruction to produce an animation and the photo-sensor may be focused on the digital instrument information itself rather than an animation. The photo-sensor may detect a fault in the display device in a similar manner as described above. In these embodiments, however, the photo-sensor may detect significantly more false faults as compared to those embodiments wherein the data stream is augmented with an animation instruction.

Controller 100 functions to communicate with the photo-sensor 300 and warning device 400. Controller 100 may comprise a hardwired electrical circuit. In some embodiments, controller 100 may be free of memory components and processors. In some embodiments, controller 100 may be free of programmable software.

In some embodiments, when controller 100 detects a fault, for example by sensing an interruption in the animation, the controller may send a signal to warning device 400. Warning device 400 may then trigger warning signal. In one embodiment, the warning signal may comprise lighting up a warning light. In another embodiment, the warning signal may comprise turning off a warning light. This may provide an additional failsafe, preventing a failure of the lighting element from allowing a warning to go undetected. In still other embodiments, the warning signal may comprise an audible alarm.

Figure 2:
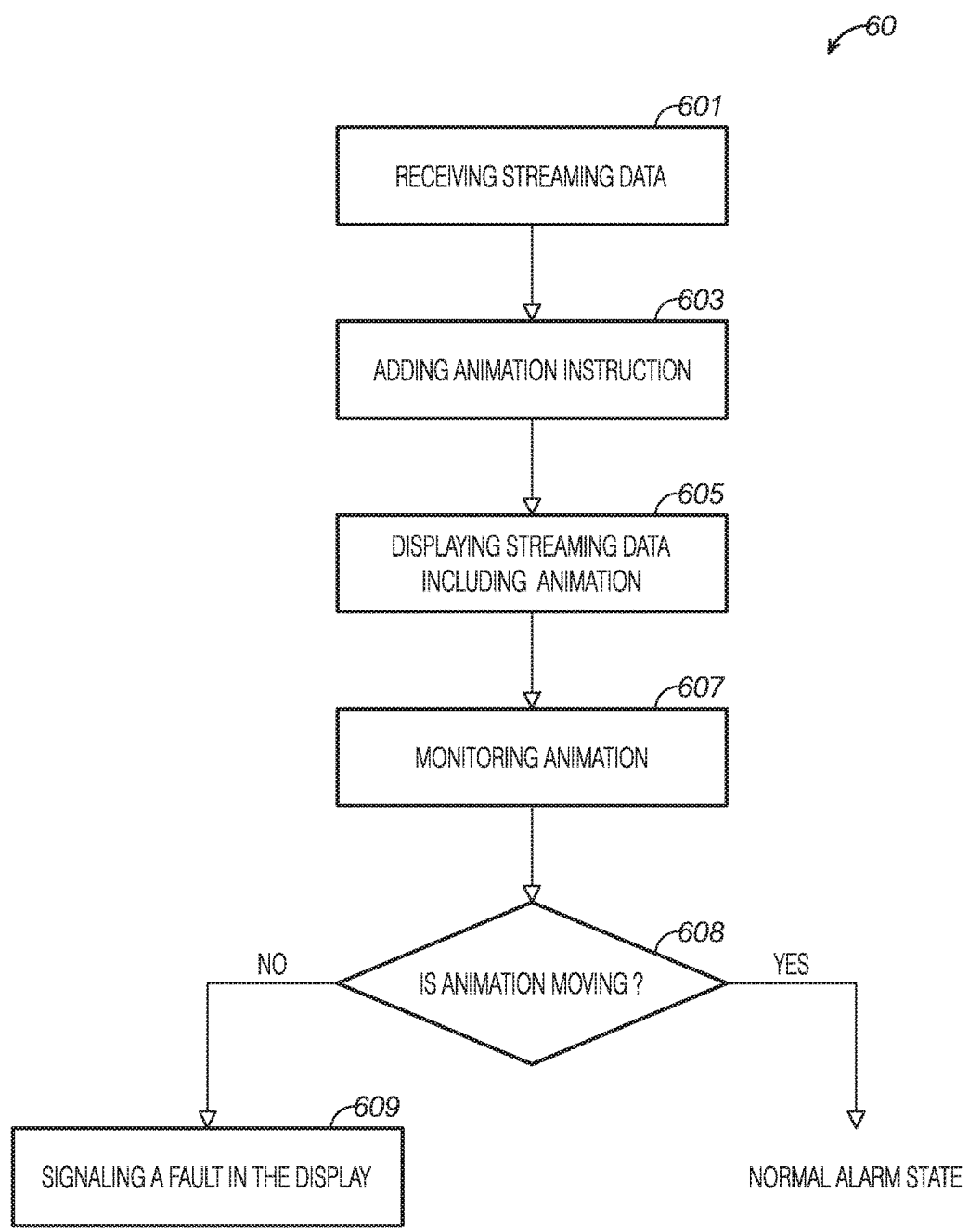
FIG. 2 is a schematic illustration of a first example of a method for sensing a fault in an electronic display.

Turning now to FIG. 2, a method 60 for sensing a fault in the data stream of an electronic display will now be described. Method 60 includes the steps of receiving 601 streaming data, adding 603 an animation instruction to the streaming data, displaying 605 the streaming data including displaying the animation, monitoring 607 the animation, sensing 608 whether the animation has been interrupted, and signaling 609 a fault.

Adding 603 the animation instruction to the streaming data may take place at any point. In one embodiment, the animation instruction may be appended to the steaming data at or near the source of the streaming data. In another embodiment, the animation instruction may be appended to the streaming data via the display device.

Displaying 605 the streaming data may be performed via a screen of the display device. Displaying 605 the streaming data may including producing, in response to the animation instruction that may have been added to the streaming data, an animation. The animation may be displayed in a dedicated area of the screen, such as one corner of the screen.

Monitoring 607 the animation may be performed via the photo-sensor. Sensing an interruption 608 may be performed via the controller. In one embodiment, the sensing step may comprise evaluating, at the controller, whether the animation is still moving based on electrical signals received from the photo-sensor.

The signaling 609 step may be performed via the warning device. In one embodiment the signaling step may comprise changing a state of warning light. For example, the signaling step may comprise changing the state of the warning light from on to off to indicate a fault in the electronic display. In another example, the signaling step may comprise changing the state of the warning light from off to on to indicate a fault in the electronic display. In some embodiments, the signaling step may comprise sounding an audible alarm.

In some embodiments, the sensing 608 and signaling 609 steps are performed entirely through a hardwired electrical circuit. Thus, in some embodiments, all of the sensing 608 and signaling 609 steps may occur with the use of programmable software.

Turning now to FIG. 3, one example of a hardwired electrical circuit for use in controller 100 is illustrated. FIG. 3 is a schematic diagram of the circuit. As can be seen, the circuit depicted in FIG. 3 is entirely hardwired and not configured to execute programmable software.

While the systems and methods have been explained in the context of aviation, the systems and methods described are applicable in any application, including nautical and terrestrial vehicles or any other application where sensing a fault in a digital display is desired.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method, comprising:
  receiving, at a display device, streaming data from an electronic device to be displayed at the display device;
  appending an animation instruction to the streaming data, the animation instruction including an animation object to display on the display device, wherein the animation object changes over a period of time;
  displaying a first portion of the streaming data at a first portion of a screen of the display device;
  displaying a second portion of the streaming data at a second portion of the screen, wherein the second portion of the streaming data includes the animation object;
  determining, by a photo-sensor, whether the animation object at the second portion of the screen is changing over the period of time;
  in response to the animation object not changing over the period of time:
    determining an interruption in the streaming data has occurred; and
    sending a fault notification to the display device or another device; and
  in response to the animation object changing over the period of time, continuing displaying the first portion of the streaming data at the first portion of the screen and the second portion of the streaming data at the second portion of the screen.

2. The method of claim 1, wherein sending the fault notification comprises changing a state of a warning light.

3. The method of claim 2, wherein changing the state of the warning light comprises changing the warning light from on to off to indicate a fault in the display device.

4. The method of claim 2, wherein changing the warning light comprises changing the warning light from off to on to indicate a fault in the display device.

5. The method of claim 1, wherein the fault notification comprises an audible alarm.

6. The method of claim 1, wherein the fault notification provides a notification to a user without the use of programmable software.

7. The method of claim 1, wherein the fault notification provides a notification to a user entirely through a hardwired electrical circuit.

8. The method of claim 1, wherein the animation object comprises a strobing image.

9. The method of claim 1, wherein the animation object comprises a rotating image.

10. The method of claim 1, wherein the photo-sensor comprises a detection photocell.

11. A method, comprising:
  receiving streaming data from an electronic device to be displayed at a display device;
  receiving an animation object to display on the display device, wherein the animation object changes over a period of time;
  displaying the streaming data and the animation object via a screen of the display device;
  determining, by a photo-sensor, whether the animation object is changing over the period of time;
  in response to the animation object not changing over the period of time:
    determining an interruption in the streaming data has occurred; and
    sending a fault notification to the display device or another device; and
  in response to the animation object changing over the period of time, continuing displaying the streaming data and the animation object on the screen.

12. The method of claim 11, wherein sending the fault notification comprises changing a state of a warning light.

13. The method of claim 12, wherein changing the warning light comprises changing the warning light from on to off to indicate a fault in the display device.

14. The method of claim 12, wherein changing the state of the warning light comprises changing the warning light from off to on to indicate a fault in the display device.

15. The method of claim 11, wherein the fault notification comprises sounding an audible alarm.

16. The method of claim 11, wherein the fault notification provides a notification to a user entirely through a hardwired electrical circuit.

17. The method of claim 11, wherein the animation object comprises a strobing image.

18. The method of claim 17, wherein the strobing image comprises a rotating image.

19. The method of claim 11, wherein the photo-sensor comprises a detection photocell.

20. A device, comprising:
  a display device configured to display streaming data and an animation object;
  a sensor configured to detect a movement of the animation object on the display device;
  a processing device coupled to the display device and the sensor, wherein the processing device is configured to:
    receive streaming data from a first electronic device;
    receive the animation object from the first electronic device or a second electronic device, wherein the animation object changes over a period of time;
    display, by the display device, the animation object;
    determine, by the sensor, whether the animation object at the display device is changing over the period of time;
    in response to the animation object not changing over the period of time:
      determine an interruption in the streaming data has occurred; and
      send a fault notification to the display device or another device; and
    in response to the animation object changing over the period of time, display the streaming data and the animation object.

* * * * *